June 24, 1930.    A. W. BURWELL    1,768,523
EMULSION FROM PARTIALLY OXIDIZED PETROLEUM WAX AND PROCESS OF MAKING THE SAME
Filed March 23, 1927
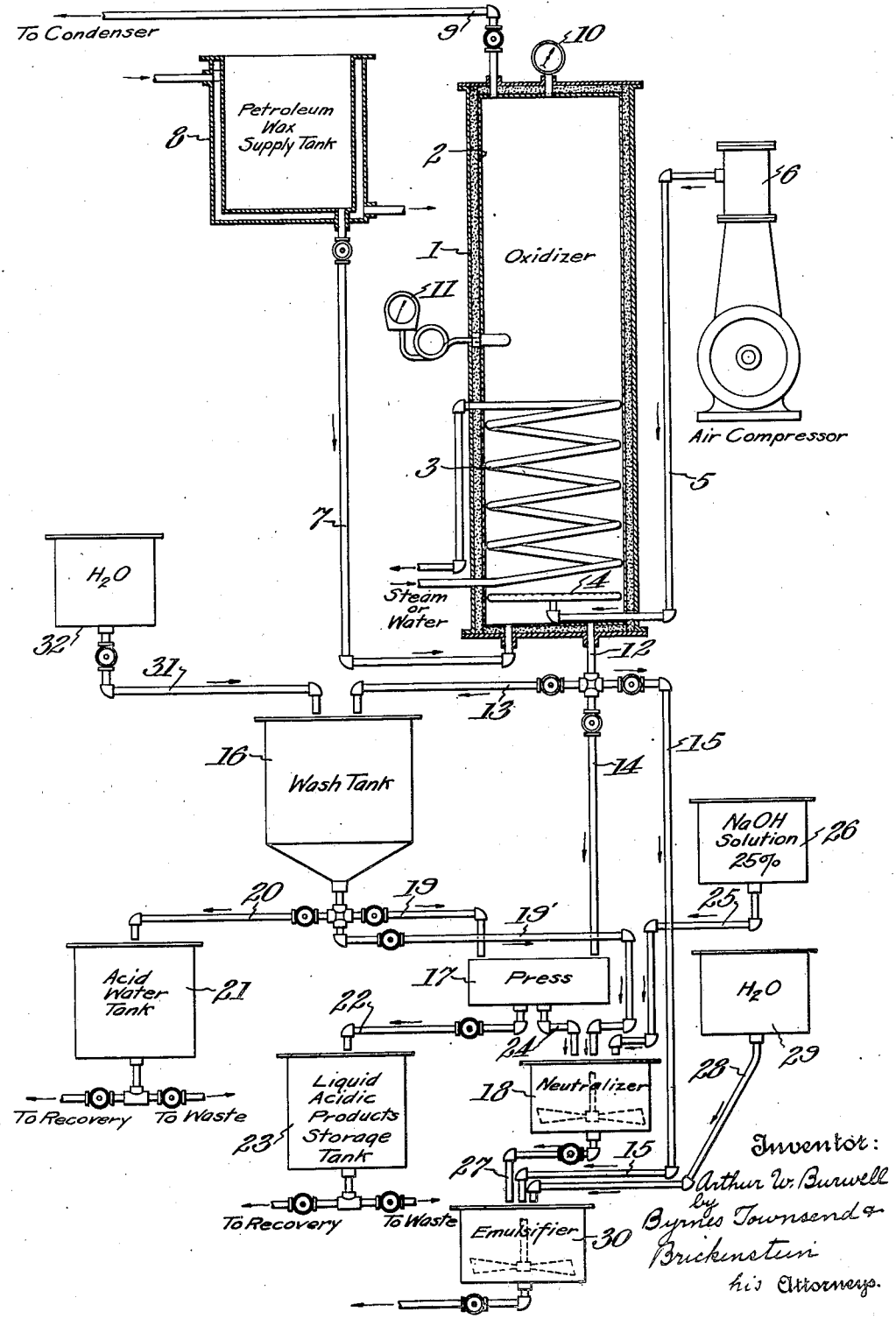

Patented June 24, 1930

1,768,523

UNITED STATES PATENT OFFICE

ARTHUR W. BURWELL, OF NIAGARA FALLS, NEW YORK, ASSIGNOR TO ALOX CHEMICAL CORPORATION, OF NEW YORK, N. Y., A CORPORATION OF NEW YORK

EMULSIONS FROM PARTIALLY-OXIDIZED PETROLEUM WAX AND PROCESS OF MAKING THE SAME

Application filed March 23, 1927. Serial No. 177,803.

This invention relates to emulsifiable, partially oxidized, products from normally solid petroleum waxes, to emulsions derived from said emulsifiable, oxidized products, and to processes of making said emulsifiable, partially oxidized products and said emulsions.

The invention is based upon my discovery of the fact that partially oxidized products obtained by the limited and controlled liquid-phase oxidation of certain normally solid, aliphatic hydrocarbons, or of mixtures of said hydrocarbons, are emulsifiable by known means and yield, upon neutralization, self-emulsifiable products from which there easily may be produced stable emulsions especially adapted for various uses, such as, for example, sizing and coating paper products and dressing textile fabrics. The application of these emulsions to paper, either as a coating upon the surface or as an insoluble size fixed upon the fibers, imparts to the paper decided water- and ink-repellant properties with practically no depreciation of the strength of the paper. The emulsions may be used alone or in conjunction with known materials adapted for use as or in paper coating compositions and paper sizing agents.

The process of making these emulsifiable, partially oxidized products and the emulsions obtainable therefrom, consists essentially in the following operations:

Normally solid petroleum waxes, such as the high molecular-weight aliphatic hydrocarbons, or mixtures thereof, known as scale wax, paraffin wax, and the like, are contacted in the liquid phase with an oxygen-containing gas, in the presence of an exciter of oxidation, at reacting temperature and at a pressure greater than atmospheric pressure; the resulting partially oxidized waxes are neutralized by treatment with the requisite amount of an alkali either directly or after a washing operation, and subsequently emulsified with water. Depending upon the desired physical properties of the final emulsion, the partially oxidized waxes may or may not be subjected to pressure filtration, or other suitable method of separation, such as, for example, selective solution, centrifuging or the like, for the purpose of expressing the small amount of highly acidic liquid (i. e., oily) bodies usually associated with the solid, partially oxidized waxes comprising the reaction mixture, prior to the neutralization step. Also, the neutralization operation may or may not be carried to complete neutralization, or the said partially oxidized waxes may be treated with an excess of alkali, depending upon the desired acidic, neutral or basic reaction of the final emulsions obtained therefrom.

As starting material there may be used any of the solid waxes obtained from crude petroleum, such as, for example, the products known in the petroleum industry as paraffin wax, crude scale wax, ozokerite, rod wax, the solid wax-like body known as "Sharples wax," or other normally solid wax-like bodies of similar origin. The "Sharples wax" is prepared by diluting crude petroleum with light petroleum distillate such as gasoline, chilling the mixture to a temperature of about $-17°$ F., and centrifugally separating the resulting waxy solid bodies from the unsolidified oil whereby there is obtained a sticky, non-crystalline, translucent solid of rather dark color. The aforesaid paraffin wax and crude scale wax are solid bodies consisting essentially of mixtures of high-molecular weight hydrocarbons of the paraffin series having the general formula $C_nH_{2n}+2$. The specific gravities and melting points of the said waxes vary within a rather wide range, the average melting point being about 53–58° C., and the average specific gravity being about 0.8400.

The invention will be described and illustrated hereinafter by reference to a specific procedure in accordance with the invention.

In the accompanying drawing there is shown diagrammatically one form of apparatus suitable for use in carrying out the process of the invention.

The oxidation step proper takes place in an upright cylindrical reaction vessel or oxidizer 1, which may be, for example, about 5 feet in diameter and about 16 to 18 feet in height. The oxidizer 1 may be made of any suitable material such as iron or steel and should be capable of withstanding pressures up to at least 350 pounds per square inch. Preferably, the oxidizer 1 should be made of or lined with material which is resistant to the corrosive action of the reaction mixture; for example, provided with an inner shell of aluminum 2. The oxidizer is provided at a point near its lower end with a tight coil 3 which serves as a heating or cooling coil as required. Suitable means, not illustrated, such as a jacket surrounding the oxidizer, also may be used to control the temperature of the oxidation reaction. At a point between the lower end of the oxidizer 1 and the tight coil 3 is an air spray pipe 4 connected by pipe line 5 to an air compressor 6. Air spray pipe 4 is so designed that air is ejected from it preferably in the form of fine bubbles. 7 is a valved conduit leading from the jacketed petroleum wax supply tank 8 to the oxidizer 1. 9 is a valved gas discharge pipe, 10 is a pressure gauge and 11 is a thermometer.

From the bottom of the oxidizer 1 extends the branched conduit 12 with valved conduits 13, 14 and 15 leading to the wash tank 16, the press 17 and the emulsifier 30, respectively; 31 is a valved conduit connecting source of water supply 32 and the wash tank 16, and 19, 19' and 20 are valved conduits leading from the wash tank 16 to the press 17, the neutralizer 18 and the acid water tank 21, respectively.

The press 17 may be of any suitable type, but I prefer to use an hydraulic press capable of exerting a pressure of at least 150 pounds per square inch. 22 is a valved conduit leading from the press 17 to the liquid acidic products storage tank 23. 24 represents means for transferring solid oxidized wax from the press 17 to the agitated neutralizer 18, and 25 is a valved conduit leading from the source of supply of alkaline solution 26 to the neutralizer 18. 27 and 28 are valved conduits leading to the agitated emulsifier 30 from the neutralizer 18 and source of water 29, respectively.

The process is carried out in the apparatus illustrated as follows:

The oxidizer 1 is charged with molten petroleum wax, of the nature and type above identified, from the supply tank 8, a small amount of an oxidizing catalyst or exciter of oxidation, such as a compound of manganese copper or iron,—say manganese oleate,— amounting to about 0.1 per cent of the weight of the wax (i. e., 10–15 pounds of catalyst per 1,000 pounds of charge), or a quantity of previously oxidized wax from which the acidic bodies have been separated or not, is added and the mixture heated up to a temperature in the neighborhood of 100° C. or higher (preferably to about 130–140° C.) and an oxidizing gas, preferably air, is supplied through the spray pipe 4. Gases are permitted to accumulate in the oxidizer until the desired pressure is reached, after which the pressure is maintained or regulated by controlling the discharge of gases through the valved gas discharge pipe 9. The pressure may vary considerably, say from 150 to 350 pounds per square inch. The preferred pressure will depend upon a number of conditions, including the temperature maintained, the particular kind of hydrocarbon mixture under treatment, the rate of air supply, and, if oxygen-enriched air is used, upon the richness of the oxygen supply. It is preferred to carry out the oxidation process under such conditions that the reaction is substantially self-sustaining. In general, the reaction is self-sustaining at a temperature of about 130–140° C., and at a pressure of about 250 pounds per square inch, with the hydrocarbon under treatment, although temperatures and pressures may vary between wide limits. Thus, for example, oxidation has been observed at a temperature as low as 100° C.; it is more rapid above 120° C., and the temperature may be allowed to rise to 155° C. with satisfactory results under some circumstances. Therefore, while I prefer to carry out the oxidation process at a temperature at which the reaction rate is fairly rapid, say 130–140° C., it is to be understood that the invention includes the employment of all suitable temperatures at which oxidation takes place without detrimental effect to the product, which temperature ordinarily does not exceed about 140° C.

During the oxidizing treatment, as is stated above, gases collecting in the upper end of oxidizer 1 are released through the pipe 9. These gases contain practically no oxygen, but do contain carbon dioxide, nitrogen and varying quantities of volatile acids, ketones and other products of the oxidation. The volatile acids, ketones and other products may be condensed in a suitable condenser (not shown) and further treated for the recovery of formic acid, mixed light ketones, etc.

During the course of the treatment of the petroleum distillate in the oxidizer 1, there appear to be formed, during the earliest stages of oxidation, formic acid and high-molecular weight alcoholic ketonic and/or aldehydic bodies; continued oxidation results in the production of neutralizable water-insoluble carboxylic acids having molecular weights approximately one and one-half times those which would naturally be calculated for acids derived from the original (i. e., unoxidized) hydrocarbons, together with unneutralizable alcohols, ketonic and/or aldehydic bodies, and possibly ethers, esters and the like.

For the purposes of the invention a desirable point at which to discontinue the oxidation treatment is when the total amount of acidic compounds so formed equals about 30% by weight of the reaction mixture in the oxidizer 1, as determined from the alkali equivalent of the mixture calculated upon the molecular weight of the compounds composing it (e. g., upon an average molecular weight of 400). When such a reaction mixture, containing about 30% of acidic products, such as that obtained by the partial oxidation of crude scale wax of 124–126 A. M. P. in the manner heretofore described, is subjected to pressure filtration at about 150 pounds per square inch, or to an equivalent separation treatment, while maintained at a temperature of 18°–22° C., it will lose approximately 20% of its weight.

In investigating the character of the partially oxidized products obtained under the above conditions with respect to the completeness of the chemical change effected by the oxidation treatment, recourse was had to the known test for determining the amount of paraffin or other unemulsifiable wax in adulterated beeswax. Said test consists essentially in treating one part by weight of the beeswax with four parts by weight of sulfuric acid 66° Bé. at 120° C. for thirty minutes, pouring the hot mass into a large volume of warm water, cooling the water, and collecting, drying and weighing the cake which forms upon the surface of the water. The cake represents the paraffin or other unemulsifiable wax used as adulterant. This test, applied to unoxidized paraffin wax, reveals the fact that said unoxidized wax is so little attacked as to cause no perceptible difference between the weight of the cake and that of the sample tested, or apparent chemical change in the material. Applying this test to the partially oxidized mass of petroleum wax in oxidizer 1, containing about 30% by weight of acidic products, as described above, it was found that 20% of the partially oxidized wax collected into a cake on the surface of the water. Said cake was then treated with caustic soda solution, with the result that 25% by weight of the cake (i. e., 5% of the partially oxidized wax) was dissolved, leaving a residue of a peculiar stringy semi-crystalline wax having nothing of the appearance of the original (i. e., unoxidized) petroleum wax, and amounting to 15% by weight of said original petroleum wax.

That substantially all of the original petroleum wax had undergone some degree of oxidation was evidenced by the fact that the above-described partially oxidized wax, when neutralized with caustic soda solution, produced a stable emulsion upon being mixed with water, whereas the unoxidized petroleum wax apparently cannot be brought into a stable emulsion comparable to that just described by any known means. It is a fact that if as little as 5% by weight of unoxidized petroleum wax be melted with the partially oxidized wax and the resulting mixture treated in the usual manner for the production of an emulsion, there results the deposition of the wax or, often, the complete breaking down of the emulsion.

From the above tests it appears that the oxidation of the petroleum wax under the conditions above described results in the chemical transformation of about 85% of the wax into a self-emulsifiable product, and that those portions of the wax which resist the treatments with sulfuric acid and caustic alkali (i. e., the portion described heretofore as a stringy, semi-crystalline wax) are emulsifiable in the presence of said self-emulsifiable product.

The partially oxidized wax in the oxidizer 1, resulting from the oxidizing treatment above described, is allowed to cool,—the current of oxygen-containing gas being shut off and water being run through the tight coil 3,—to, say, 100°–90° C., and is then discharged from the oxidizer 1, through the branched conduit 12, either into the wash tank 16, the press 17, or the neutralizer 18, depending upon the desired subsequent treatment of the same. Preferably the said partially oxidized wax is transferred to the wash tank 16, through the valved conduit 13, and there washed with water, drawn from the source 32 through the valved conduit 31, to obtain therefrom the valuable water-soluble acids found in the reaction mixture. The mass may also be steamed to improve the odor, if such treatment is desired. The wash waters containing the said water-soluble acids are separated from the water-insoluble material and withdrawn through the valved conduit 20 to the tank 21, for recovery or running to waste.

The washed, partially oxidized wax is then transferred directly to the neutralizer 18 through the valved conduit 19', or, if desired, transferred to the press 17 through the valved conduit 19 and there subjected to pressure filtration at about 150 pounds per square inch for the removal of liquid (i. e., oily) acidic products,—amounting in the case of partially oxidized scale wax to about 20% by weight of the unwashed, partially oxidized wax. It is here noted that the partially oxidized product obtained from "Sharples wax" loses no oily or liquid acidic products upon being subjected to the pressure filtration. Said liquid acidic products are passed through the valved conduit 22 to the storage tank 23, for recovery or running to waste. The pressure filtration is effected while maintaining the partially oxidized wax at a temperature slightly above the solidifying point of the liquid acidic products, say at about 18°–22° C. Below about ordinary room temperature the liquid acidic products gelatinize. The resulting press cake is considerably lighter in color than the original unpressed, partially oxidized wax. It still contains some liquid acidic products and crystallizable solid acids.

The purpose of the pressure filtration above described is to obtain the more solid, partially oxidized products especially suitable for the preparation of stable emulsions adapted for use as paper sizing agents and paper coating compositions. If the washed, partially oxidized wax is to be used for the preparation of emulsions adapted for use as textile softeners, the pressure filtration may be dispensed with, and the said washed, partially oxidized wax may be transferred directly to the neutralizer 18 for neutralization treatment.

The press cake obtained by the pressure filtration in press 17 is transferred to the neutralizer 18 by any suitable means, as indicated on the diagrammatic drawing by the reference numeral 24, or the washed, unpressed, partially oxidized wax from wash tank 16 may be transferred directly to the neutralizer 18 through the valved conduit 19: in either event the partially oxidized wax is next subjected to partial or complete neutralization.

A preferred method of effecting the neutralization is as follows:

The partially oxidized wax, with or without having been subjected to pressure filtration and with or without washing, is introduced, in the molten state, into the neutralizer 18, with agitation. Alkali solution such as, for example, caustic soda solution of about 25% strength, then is introduced slowly, care being exercised that each addition is thoroughly admixed with the partially oxidized wax before a test as to the degree of neutralization is made. Ordinarily, the amount of alkali to be added is predetermined. The desired degree of neutralization is attained when a sample taken from the batch in the neutralizer 18 and admixed with water containing a few drops of phenolphthalein solution at a temperature above the melting point of the sample (e. g., at about 70° C.) shows a persistent pink coloration on continued stirring. During the addition of the alkaline solution the partially saponified partially oxidized wax becomes a smooth, stiff, translucent jelly; this jelly becomes cloudy as the end point of neutralization is reached, which cloudiness increases when additional caustic soda solution, or water, is introduced. After the desired degree of neutralization has been attained, the resulting neutralized partially oxidized wax is transferred to the agitated emulsifier 30 through the valved conduit 27, and water at a temperature of about 20° C. is slowly introduced, through the conduit 28 from the source 29, with constant agitation. It will be obvious that the functions of emulsifier 30 may be assumed by the neutralizer 18, and that the emulsification step may be carried out in said neutralizer to the total exclusion of the emulsifier 30. The addition of the cool water to the neutralized, partially oxidized wax reduces the temperature of the same at about the right rate so that when water amounting to 100% of the weight of the neutralized, partially oxidized wax has been added, it will be found that the phase has changed, the water being the external phase and the neutralized, partially oxidized wax the internal phase, at which changing point the turbidity of the emulsion suddenly changes to white. The admixture of more water therein may be carried on safely at will, no particles or lumps of any kind appearing. In the event that the emulsion is to be used as a coating composition for paper, there may be added to the aforesaid jelly unneutralized, partially oxidized wax (either direct from the oxidizer 1 or from the press 17) in an amount up to 20–30% by weight of the neutralized, partially oxidized wax, for the purpose of making the whole mass acid in reaction. The unneutralized partially oxidized wax readily emulsifies with the neutralized product.

The resulting emulsion, which, when drawn off into containers and allowed to cool, is found to "set" to a stiff gel, is remarkably stable, and permits great dilution without separation. This property may be accounted for by the fact that the suspended particles are in an extremely finely sub-divided state. As a result, the emulsions leave no greasy streaks or marks when applied as a gloss coating to the paper sheet; whereas, with emulsions of unoxidized wax and sodium stearate (or other known emulsifying agent) greasy streaks or marks are very apt to occur and the distribution of the unoxidized wax usually is imperfect. Moreover, in the unoxidized wax-sodium stearate emulsions the amount of soap necessary for the production of a suspension or emulsion is relatively great and depreciates the quality of the gloss or other coatings.

The non-acid emulsions, obtained as above described, are adapted for use as textile softeners or dressings. They may be so prepared as to be stable in the presence of acetic and formic acids, and of considerable quantities of hydrochloric acid, even when the presence of the acid is continued over a long period of time (e. g., six months or thereabouts). In the case of dressings for cotton the emulsions may be made slightly alkaline, or at least non-acid. The emulsions,—particularly the emulsion from partially oxidized "Sharples wax,"—impart to textiles a marked water-and/or-moisture-repelling property which may amount to waterproofness.

Regarding the special adaptability of the emulsions for use as paper sizing agents and paper coating compositions, an important feature is the marked ink- and water-and/or-moisture-repelling properties which they impart to the paper in which, or on which, they are used. Particularly is this true with respect to the emulsions prepared from partially oxidized "Sharples wax," it being a fact that papers so sized or coated are practically impervious to water. The emulsions may be surface coated on one or both surfaces of the paper, wallboard, pasteboard, or other paper product, or they may be mixed with clays, casein, glue and the like for gloss-coating fine papers. Other fibrous materials or fibrous products such as for example, asbestos or asbestos products, may be rendered waterproof or water- and/or moisture-repellent by the use of these emulsions. They also are adapted for use in rendering walls of brick, stone or concrete waterproof or water-repellent.

I have found, also, that the heretofore-described emulsions may be admixed with other sizing agents (e. g., rosin size) and added to the pulp in the beater or paper engine, or at any other point in the process previous to the formation of the sheet on the machine; or, they may replace the known sizing agents, being added to the pulp and fixed therein by treatment with alum or other equivalent reactive agents, such as calcium chloride or any other salt capable of forming insoluble compounds by reaction with these materials, in the known manner, thereby forming in one operation a waxed paper having any desired content of wax.

As an example, a sizing agent from partially oxidized wax and rosin is prepared as follows: the partially oxidized wax (e. g., "Sharples wax") is melted with rosin and into the molten mixture there is introduced an aqueous alkaline solution amounting to one-half to two-thirds of the weight of said molten mixture. The concentration of the alkali (e. g., caustic soda, sodium carbonate, or the like) is predetermined so as to neutralize at least a substantial portion of the partially oxidized wax and to give whatever free rosin content is desired. The reaction mixture is boiled for a period of time sufficient to effect the "cutting" of the rosin and the production of a homogeneous soap. The resulting soap is stable, and will not separate on standing. It is emulsified by adding water at about 60° C., to the molten soap, with constant agitation, to the production of a stable emulsion in which there occurs no separation of the finely-subdivided particles even on long standing in a diluted state. The proportion of the partially oxidized wax to the rosin in the emulsion is not fixed, and may be varied at will to yield a product having the required characteristics. The emulsion is added to the paper pulp in the beating engine and precipitated in, with or upon the fibers of the pulp by treatment with alum or other equivalent reactive agents, such as calcium chloride or any other salt capable of forming insoluble compounds by reaction with these materials. The insoluble salt of the partially oxidized wax acts as a softener for the insoluble resinate, thereby reducing the disadvantageous brittleness of the resinate without appreciably decreasing the bursting strength (Mullen test) of the paper sheet. The insoluble salt of the partially oxidized wax materially adds to the ink- and water-repelling properties of the paper, and, in those cases where the proportion of partially oxidized wax to rosin is high, produces a paper which is in fact waterproof.

The said emulsions adapted for use as paper coating compositions do not require the use of a solvent such as gasoline or the like, as do many of the known coating compositions, nor do they take fire at the temperature of boiling water.

It will be apparent that the invention comprehends the preparation of concentrated emulsions of partially oxidized petroleum waxes, which concentrated emulsions may be stored and/or transported and subsequently diluted to the desired degree by admixture with water.

I claim:

1. Process which comprises contacting an oxygen-containing gas with a normally solid petroleum wax, at reacting temperature and at a pressure greater than atmospheric pressure, in the presence of an exciter of oxidation, until the acidic compounds content of the reaction mixture is about 30% by weight.

2. Process which comprises contacting an oxygen-containing gas with a normally solid petroleum wax, at reacting temperature and at a pressure greater than atmospheric pressure, in the presence of an exciter of oxidation, until the acidic compounds content of the reaction mixture is about 30% by weight, and emulsifying the resulting partially oxidized wax with water.

3. Process which comprises contacting an oxygen-containing gas with a normally solid petroleum wax, at reacting temperature and at a pressure greater than atmospheric pressure, in the presence of an exciter of oxidation, until the acidic compounds content of the reaction mixture is about 30% by weight, neutralizing the said reaction mixture by treatment with the requisite amount of an alkali and emulsifying the resulting neutralized, partially oxidized wax with water.

4. A process which comprises contacting an oxygen-containing gas with a normally solid petroleum wax, at reacting temperature and at a pressure greater than atmospheric pressure, in the presence of an exciter of oxidation, until the acidic compounds content of the reaction mixture is about 30% by weight, separating from the resulting reaction mixture substantially all of the water-soluble oxidation products derived from said wax, neutralizing the residual partially oxidized wax by treatment with an alkali, and emulsifying the resulting neutralized residual partially oxidized wax with water.

5. Process which comprises contacting an oxygen-containing gas with a normally solid petroleum wax, at reacting temperature and at a pressure greater than atmospheric pressure, in the presence of an exciter of oxidation, until the acidic compounds content of the reaction mixture is about 30% by weight, separating from the resulting reaction mixture the normally liquid acidic compounds derived from said wax, neutralizing the residual, partially oxidized wax by treatment with an alkali, and emulsifying the resulting neutralized residual, partially oxidized wax with water.

6. Process which comprises contacting an oxygen-containing gas with a normally solid petroleum wax, at reacting temperature and at a pressure greater than atmospheric pressure, in the presence of an exciter of oxidation, until the acidic compounds content of the reaction mixture is about 30% by weight, separating from the resulting reaction mixture the water-soluble oxidation compounds derived from said wax, subjecting the residual, partially oxidized wax to pressure filtration whereby to remove substantially all of the normally liquid acidic compounds derived from said wax, neutralizing the residual, normally solid, partially oxidized wax by treatment with an alkali, and emulsifying the resulting neutralized, partially oxidized wax with water.

7. Process which comprises contacting an oxygen-containing gas with a normally solid petroleum wax, at reacting temperature and at a pressure greater than atmospheric pressure, in the presence of an exciter of oxidation, until the acidic compounds content of the reaction mixture is about 30% by weight, separating from the reaction mixture substantially all of the water-soluble oxidation compounds derived from said wax, subjecting the residual, partially oxidized wax to pressure filtration whereby to remove substantially all of the normally liquid acidic compounds derived from said wax, admixing rosin with the residual, normally solid, partially oxidized petroleum wax, treating the resulting mixture with alkali in an amount sufficient to neutralize at least a substantial portion of the partially oxidized wax therein, and emulsifying the resulting product with water.

8. As a new composition of matter, an emulsion comprising neutralized, partially oxidized petroleum wax and water.

9. As a new composition of matter, an emulsion comprising neutralized, normally solid, partially oxidized petroleum wax, an emulsifiable resin and water.

10. As a new composition of matter adapted for use in sizing paper, an emulsion comprising neutralized normally solid, partially oxidized petroleum wax, free of water-soluble constituents, an emulsifiable resin, and water.

11. An emulsion comprising neutralized, normally solid, partially oxidized, petroleum wax, substantially free from the water-soluble and normally liquid acidic products derived from said wax, an emulsifiable resin, and water.

In testimony whereof, I affix my signature.
ARTHUR W. BURWELL.